UNITED STATES PATENT OFFICE 1,939,540

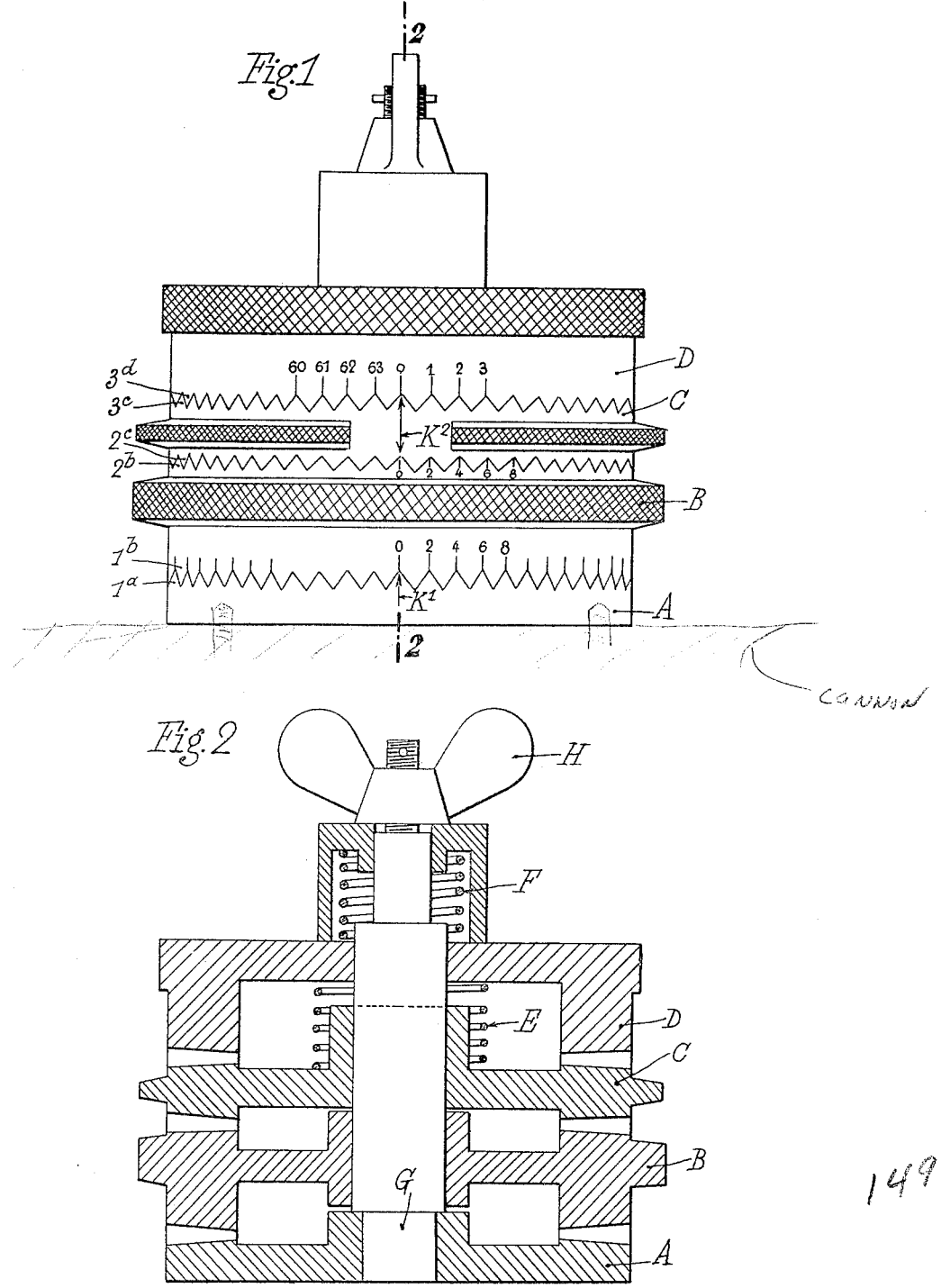

MECHANISM FOR ANGULAR ADJUSTMENT OF GUN SIGHTS

Gustave Charvet, Paris, France, assignor to Société des Etablissements Krauss.-Optique Et Mecanique de Precision, Paris, France Application January 24, 1930, Serial No. 423,233, and in France May 28, 1929

4 Claims. (Cl. 33—48)

The present invention relates to mechanisms for angular adjustment, more particularly adapted for goniometric sighting instruments for firearms.

The sighting instruments in current use for firearms comprise a goniometer for recording azimuth or direction and a goniometer or clinometer for recording the angles of elevation.

In practice, the angular increments to be recorded with precision are small, and are generally upon the order of magnitude of the decigrade (1/4000 of the circumference) or of the mil (1/6400 of the circumference); on the other hand, the size of the goniometer circles should be reduced to a minimum.

For these reasons, the instrument is often provided with a gear wheel rotated by a tangent screw, these two parts being so designed that each revolution of the tangent screw rotates the gear wheel by 100 mils or by 100 decigrades, according to the graduation employed.

A scale divided into units of 100 mils or decigrades is rotatable with said gear wheel and the tangent screw carries a drum whose scale is divided into 100 parts and upon which the small unit of measurement (mil or decigrade) can be read.

Experience has shown that this arrangement, which is applied with success to instruments adapted for observation and measurement, cannot be properly employed in sighting instruments which are to remain permanently upon the cannon or the like during the firing.

Due to the shocks caused by the severe and rapidly repeated reactions of the firing, the tangent screw rotates by itself, thus altering the recorded angles; the line of sight, which is usually given by a sighting or collimating telescope, thus moves with respect to the firing line. Although the braking of the tangent screw prevents such displacements, the inevitable backlash or play between the screw and its gear wheel produces a pounding down at their points of contact, during the firing operations, in the positions most frequently in use.

Sighting instruments have also been provided, embodying disks engaging one another by means of teeth, so that the disks may be secured integrally or separated for relative rotation. Such devices are proof against changes of adjustment under the firing reactions, but they are not adapted for recording sufficiently small angles, since the teeth would be exceedingly small, for example, if a circle of less than one decimeter in diameter should be divided into 3000 parts.

Consequently, the disks which are coupled by means of teeth, such as are now used, are provided with scales having a spacing of 100 units, while the subdivisions of such graduations in 100 units are obtained by means of a tangent screw or by a suitable screw pushing on a radial lever arm.

The present invention has for its object to devise an improved sighting instrument, chiefly adapted for recording azimuth angles or angles of elevation in firing arms, whose essential feature resides in that it comprises in combination a set of members which are coupled or clutched together by means of differential sets of teeth, for the subdivision into small angle units, whereby the record of all angles, even the smallest, may be effected by differential teeth.

In the accompanying drawing, and by way of example:

Fig. 1 is an elevational view of a sighting goniometer according to the invention.

Fig. 2 is a diametrical section on the line 2—2 of Fig. 1.

In the form of construction herein illustrated, the instrument comprises a disk A adapted to be rigidly secured on the cannon or the like. For this purpose, it may be provided with lugs, clips, dovetail parts or the like (not shown) by which it can be attached to the firearm. Upon said disk is mounted a pivot pin G. The upper face of said disk A is formed with suitable teeth $1^a$, $n$ denoting the number of such teeth.

Above disk A is mounted a disk B which is loose on pivot pin G and carries on its lower face suitable teeth $1^b$, whose number is also $n$, and which cooperate with the teeth $1^a$ of disk A. On the upper face of disk B is another set of teeth $2^b$, whose number is denoted by $m$.

Above disk B is mounted a disk C, which is loose on the pivot pin G and carries on its lower face a set of teeth $2^c$ ($m$ in number), engaging the teeth $2^b$ of disk B. On the upper face of disk C is a set of teeth $3^c$ ($p$ in number).

Upon disk C is arranged a disk D which is loose on pin G and carries on its lower face a set of teeth $3^d$ ($p$ in number). Disk D carries the sighting instrument proper, which is to be oriented with reference to the line of fire. The several disks A—B—C—D are held in contact by springs E and F, whereby the disks B—C—D may be rotated with reference to one another by jumping from tooth to tooth. The locking can be secured by means of a wing nut H, a lever, or like clamping means.

The teeth $1^b$, $2^b$ and $3^d$ are provided with graduations, as shown. Disk A carries an indicating mark K¹, facing the figures of the teeth 1ᵇ, and disk C carries an indicating mark K² facing the figures of the teeth 2ᵇ and also those of the teeth 3ᵈ. Disks B—C—D are preferably milled for their more ready actuation.

The operation is as follows:

The nut H being released, disk D is turned, so as to record the angle with the approximation of $\frac{1}{p}$ of a revolution; for instance, if $p=64$, disk D will record the desired angles before the mark K² with an approximation of $\frac{1}{64}$ of a revolution, that is, in hundreds of mils.

Disk C is then rotated, together with disk D, so as to bring before the mark K² a suitable graduation, corresponding to a whole number S of teeth—(S being less than $n$). Finally, disk D is rotated together with disks C and D, in the proper direction in order to record before the mark K¹ the same graduation, corresponding to the same number of teeth S.

The direction of the increasing numbers in the graduations and the numbers $m$ and $n$ being properly chosen, this double rotation of C and B causes a rotation of disk D through $$\frac{S}{n}-\frac{S}{m} \text{ revolutions, or } S\frac{m-n}{m \times n} \text{ revolutions.}$$

For instance, if $n=56$ and $m=57$, disk D will have rotated, for one tooth of the set 2ᵇ and one tooth of the set 1ᵇ, through $$\frac{57-56}{57 \times 56} = \frac{1}{3192} \text{ revolution,}$$

or practically $\frac{1}{3200}$ revolution, that is 2 mils with a relative error of $\frac{1}{400}$.

In this example, the teeth 1ᵇ and 2ᵇ will be numbered in steps of 2 mils upon 50 teeth, and the apparatus can record the double mil.

For any other unit selected in dividing the circle, the numbers $m, n, p$ are to be suitably chosen in such manner as to reduce the relative error of the measurement to a minimum, while allowing a sufficient width for the teeth.

Obviously, the invention is not limited to the form of construction herein represented, which is given solely by way of example; for instance the teeth may be arranged upon concentric disks instead of upon superposed disks, and may occupy the whole or only a part of the circle. The instrument may be associated with any suitable device for limiting the possible rotation to a strict minimum, while reducing the number of operations to be performed for recording an angle.

Two arrangements of the type described may be coupled together with their axes perpendicular to one another, the goniometer with the vertical axis recording the azimuths, and the goniometer with the horizontal axis recording the angles of elevation.

Having now described my invention what I claim as new and desire to secure by Letters Patent is:

1. A mechanism for angular adjustment, more particularly adapted for goniometric sighting instruments for firearms comprising two members each provided with a circular row of teeth, at least one connecting member provided with two circular rows of teeth, each row of each member engaging disconnectably with the teeth of a row of said connecting member to form respective couplings, all said members being angularly movable with respect to one another, the spacing of the teeth of at least two tooth couplings bearing a known relation to, but differing from each other.

2. A mechanism for angular adjustment more particularly adapted for goniometric sighting instruments for fire-arms comprising two outer discs each provided with a circular row of teeth, at least one connecting disc provided with two circular rows of teeth, said three discs being rotatable about a common axis, and each of said rows of teeth occupying a whole circle centered on said axis, each row of each outer disc engaging disconnectably with a respective row of said connecting disc to form respective couplings, all said discs being angularly movable with respect to one another, the teeth of each row being equally spaced, and the spacing of the teeth of at least two tooth couplings bearing a known relation to, but differing from each other.

3. A mechanism according to claim 2, in which the numbers of teeth of at least two tooth couplings differ from each other by a figure which is small with respect to the product of said numbers of teeth.

4. A mechanism for angular adjustment, more particularly adapted for goniometric sighting instruments for fire-arms comprising two outer discs each provided at its periphery with a circular row of teeth, at least one intermediate disc provided at its periphery with two circular rows of teeth on opposite faces thereof, a common pivot, said three discs being superposed and further centered on and rotatable upon said pivot, each row of each outer disc engaging disconnectably with a respective row of said intermediate disc to form respective couplings, resilient means adapted to hold said discs in adjusted position and to afford relative rotation for a new adjustment, the teeth of each row being equally spaced and the spacing of the teeth of at least two tooth couplings bearing a known relation to, but differing from each other.

GUSTAVE CHARVET.